2,713,654

SIGNALING SYSTEMS

Theodor Frankel, Rochester, N. Y., assignor to Stromberg-Carlson Company, a corporation of New York Application January 5, 1952, Serial No. 265,067

3 Claims. (Cl. 317—152)

This invention relates to signaling systems and particularly to control circuits operated over subscriber station lines for controlling switching means for interconnecting stations in a communication system.

The object of the invention is to increase the reliability of operation of switching means, particularly under adverse plant conditions. Where a telephone exchange area is compact and single party lines are employed there is little difficulty in establishing and maintaining minimum subscriber line conditions under which the central office apparatus will operate satisfactorily. However, there are situations encountered in practice particularly in rural communities where multiparty lines are used where the line impedance may exceed the limiting values and in such cases careful maintenance practices must be adhered to, with the result that the maintenance costs to prevent unsatisfactory operation may become unduly high. In particular where the number of parties on a line exceeds some figure such as five and the capacity across the line reaches an appreciable figure, or where there is low resistance leakage across the line so the calling bridge relay tends to release slowly, reliable operation is secured only at the expense of costly maintenance or additional special devices. The object of the present invention may then be restated as an effort to provide means which will respond uniformly to any condition likely to be met in practice and to eliminate the need for especially expert maintenance personnel.

The invention consists in the employment of a transient current produced on the closing of a circuit for effectively holding the said circuit firmly closed until the normal response thereto has been completed.

In a preferred embodiment of the invention the switching apparatus such as a step-by-step selective switch employs a line relay often designated as a calling bridge relay through whose windings the line current to the calling subscriber station is fed. When the switch is seized this relay is operated through the closed calling subscriber's loop, and its function is to respond to the dial pulses, each of which consists of a temporary opening of this loop circuit. If the subscriber's loop is clear and the resistance thereof is low, the calling bridge relay will respond firmly to the dial pulses and the periods of operation and release thereof will reflect almost exactly the pattern of the dial. If, however, the loop is loaded by a large number of instruments or its impedance is otherwise affected so there is heavy leakage across the lines, then the response of the calling bridge relay is sluggish and in extreme cases may give rise to faulty operation of the selective switch through allowing insufficiently long pulses for the stepping magnets to operate. Heretofore careful adjustment of the calling bridge relay and other mechanical arrangements have been employed and this has required the services of particularly expert maintenance personnel.

In accordance with the present invention, a transient current generated by and at the beginning of a pulse, consisting of a momentary release of the calling bridge relay, is employed to maintain the effect intended to be produced by this relay even though this relay fails to remain in a released condition long enough to insure a satisfactory response.

The calling bridge relay in certain conventional circuits operates a lock-pulse (LP) or hunt-assist (HA) relay which in turn closes a stepping magnet circuit. In one embodiment of the invention where the current through the stepping magnet is comparatively heavy, its battery feed connection is made through the primary winding of a transformer and the secondary winding of this transformer is connected to a separate winding of the lock-pulse relay. Therefore, as the said lock-pulse relay closes the circuit of the stepping magnet the rise of current therein produces a transient current in the secondary of the said transformer which in a properly poled secondary winding of the lock-pulse relay holds this relay firmly operated until this transient dies down. The stepping magnet will completely operate its armature before the current in its winding has reached its final value or, otherwise stated, before the change in value thereof has reached a zero level.

In another embodiment of the invention a separate winding of the lock-pulse or hunt-assist relay is connected in series with a condenser and the circuit thereof is controlled by an armature and contacts of the relay so that upon the operation of the relay the condenser is placed in a charging circuit. Through proper design of the condenser and the relay winding the charging current may be employed to hold the relay firmly operated for a period sufficient to insure the proper operation of the stepping magnet.

The advantages of this design include unlimited life, no maintenance costs, universal use on all subscriber lines, since no adjustment for marginal conditions is required, elimination of failures due to faulty mechanical adjustments, increase in the field of use of apparatus, since even longer lines may be served, and reduction of the cost of conventional switching apparatus since less critical and, therefore, less costly relays may be employed.

From a practical standpoint it has been found that the feedback apparatus, either the transformer or the condenser, may be of such small size that it may be mounted on the switch plate and does not require extra mounting space on the circuit plates. The present invention therefore provides an economical means for improving the operation of switching apparatus rendering it more reliable and increasing its field of use.

A feature of the invention is the employment of a transient current generated in the regular use of a switch controlling circuit for fortifying and sustaining the operation of a relay which might be subject to feeble and foreshortened operation under adverse line conditions. By the use of such a transient current an impulse mutilated by adverse line conditions may be made to satisfactorily operate a magnetic device requiring a comparatively strong current. Again by the use of such an arrangement the switching apparatus may be operated over lines loaded by a larger number of parties and service may thus be provided to a larger number of subscribers.

Another feature of the invention is the employment of a characteristic transient current produced by the rise of current in a circuit including an impedance, making use of the fact that such transient is of high initial and a gradually diminishing value, to fortify and sustain the operation of a relay. Where the said impedance is inductive the transient may be transformed into a surge directed through a secondary winding of a relay. Where the said impedance is capacitative the transient is led directly through the secondary winding of the relay and in either case the effect is to immediately fortify the operation of the relay and thereafter to sustain it in operation until the transient has tapered off in value. In the operation of the Y magnet 20 moves the wipers 17, 18 and 19 on to the first set of terminals of the selected level. In the event of the first trunk being engaged, the sleeve wiper 19 encounters a ground and when the HA relay 14 releases after the initial step of this Y magnet 20, it reoperates from this ground in a circuit from battery, armature 4 and back contact of the HA relay 14, the lower winding thereof, armature 4 and back contact of the XD relay 13, armature 3 and back contact of the HA relay 14, armature 2 and front contact of the RD relay 12, back contact and armature 1 of the SW relay 10 to the sleeve wiper 19. This reenergizes the Y magnet which in turn steps the wiper to the next set of terminals in the selected level. If the next trunk is also engaged the sequence of operations just described takes place once more. This interaction between the sleeve lead, the HA relay 14 and the Y magnet 20 recurs until the wipers step to a set of terminals connected to an idle trunk or until all the trunks outgoing from the level are found busy.

When the wipers are stepped to the terminals of an idle trunk, the absence of ground on the sleeve lead prevents the operation of the HA relay 14, and the SW relay 10 operates in series with the low resistance winding of the HA relay. This circuit may be traced from battery, the armature 4 and back contact of the HA relay 14, the lower winding thereof, armature 4 and back contact of the XD relay 13, armature 3 and back contact of the HA relay 14, winding of the SW relay 10, springs 3 and 4 of the X off normal set to the sleeve lead from the finder 7, which at this time is grounded at the front contact and armature 1 of the RD relay 12. Moreover, when the SW relay 10 operates, the circuit of the lower winding of the HA relay 14 is shunted from battery, primary of transformer 16, the Y magnet 20, front contact and armature 4 of the SW relay 10, to the winding thereof. The current in this circuit is not sufficient to operate either the HA relay 14 or the Y magnet so that the switch-through SW relay 10 operates to afford a clear path from the finder to the succeeding circuit selected by the selector switch. The CB relay 9 is disconnected at the armatures 2 and 3 of the SW relay 10 and it releases, thereby opening the circuit of the RD relay 12 so that in a short period of time, measured by the slow releasing characteristics of this relay, it becomes released. At this stage the circuit which has been seized is about to connect ground to the sleeve lead over the sleeve wiper 19, but the ground supplied by the armature 1 of the RD relay 12 remains connected until this ground from the succeeding circuit may be transmitted back to hold the SW relay operated during the succeeding conversational period. During this period the SW relay, therefore, remains operated from this ground transmitted back from the succeeding circuit.

In the event of all trunks outgoing from the level being busy the tip, ring and sleeve wipers 17, 18 and 19 respectively are stepped to the eleventh position and the overflow springs are actuated. Spring 5 moves from connection with spring 4 to connection with spring 6 so that busy tone is now transmitted back toward the calling subscriber instead of dial tone transmitted heretofore. A circuit is also established from ground, springs 2 and 3 of the overflow set to the lower winding of the HA relay 14, to hold this relay steadily operated. When the subscriber clears the line after receiving busy tone, the CB relay 9 releases, causing the release of the RD relay 12. Thereupon a circuit is established from ground, armature 5 and back contact of the SW relay 10, springs 5 and 6 of the X off normal set, armature 3 and back contact of the RD relay 12, through the winding of the Z release magnet 11 to battery, whereby this magnet operates and causes the tip, ring and sleeve wipers to return to their normal positions. At the same time the Z magnet places a ground on the sleeve lead to prevent any operation of the SW relay 10 and to hold the finder 7 operated until the wipers of this selective switch have reached their normal position.

Under normal conditions, where a trunk has been selected, the end of the conversation is marked by the removal of the ground from the sleeve wiper 19, whereby the SW relay 10 is released. The Z magnet 11 is thereupon operated in the manner hereinbefore described and this switch releases and in turn the finder and other circuits are released. With the switch in its normal position the X off normal springs are restored and this opens the circuit of the Z release magnet which in turn removes the guarding ground from the sleeve lead so that the selector is now in position to be seized for another call.

Fig. 2 is a fragmentary circuit showing certain elements of another embodiment of the present invention. The CB relay 21 corresponds exactly to the CB relay 9, the RD relay 22 corresponds to the RD relay 12 and the LP relay 23 corresponds to the HA relay 14. In this case this latter relay is designated LP to indicate its function as a lock-pulse relay. In the first case, the relay was designated HA to indicate its function as a hunt-assist relay. These two functions are properly the same, but the relay has been variously known in practice by both these designations.

In the present case, therefore, when the CB relay 21 first operates, it operates the RD slow release relay 22 which then prepares the circuit for the LP relay 23. On the first break in the circuit the CB relay 21 releases and establishes a circuit from ground, its armature and back contact, the armature and front contact of the RD relay 22, the upper winding of the LP relay 23, the armature 3 and back contact thereof to battery. The LP responds in this circuit and through its armature 1 and front contact establishes a circuit for the magnet 24. At the same time the LP relay establishes a charging circuit for the condenser 25 from battery, the condenser 25, the lower winding of the LP relay 23, the armature 2 and front contact thereof to ground. The condenser 25 charges in this circuit and the charging current constitutes a surge to fortify and sustain the operation of the LP relay 23 until the magnet 24 is completely operated. On the following operation of the CB relay 21 the LP relay is released and the condenser 25 is discharged by the movement of armature 2 of the LP relay from ground to battery.

What is claimed is:

1. In a signaling system, a relay connected in a circuit including a heavily loaded line and responsive to weak currents, a second relay having a first operating winding connected in a local circuit controlled by said first relay, a magnetic device responsive to comparatively strong current operated by said second relay, means associated with said magnetic device and responsive to the operation of said second relay and the current thereby flowing to operate said magnetic device for producing a transient current, and a second operating winding on said second relay included in the path of said transient current whereby the operation of said second relay by said first winding may be automatically fortified and sustained by said second winding for the duration of said transient current.

2. In a signaling system, a relay connected in a line including a large plurality of substations or having excessive leakage, a second relay in a local circuit controlled by said first relay, said second relay having an auxiliary winding, a magnetic device responsive to comparatively strong currents operated by said second relay, a transformer having one of its windings connected in series with said magnetic device and having another of its windings connected to said auxiliary winding of said second relay whereby the rise of current in said magnetic device responsive to the operation of said second relay may be transformed into a surge for fortifying and sustaining the operation of said second relay at least until said magnetic device has been operated.

3. In a signaling system, a plurality of magnets, a plurality of circuits for said magnets, a feedback transformer having a primary winding connected in common in series with the operating paths for said magnets, a relay for controlling said circuits, an auxiliary winding for said relay and a secondary winding on said transformer connected to said auxiliary winding for fortifying and sustaining the operation of said relay by transient currents produced in said auxiliary winding in response to the operating currents of any of said magnets when controlling the operation of each of said circuits.

References Cited in the file of this patent

UNITED STATES PATENTS

| | | |
|---|---|---|
| 1,464,088 | Cummings | Aug. 7, 1923 |
| 2,200,128 | West | May 7, 1940 |
| 2,254,039 | Kovalsky | Aug. 26, 1941 |
| 2,453,281 | Tedder | Nov. 9, 1948 |
| 2,625,597 | Dodd | Jan. 13, 1953 |

July 19, 1955 S. G. MEADOWS ET AL 2,713,656
ELECTRIC MOTOR FOLLOW-UP SYSTEM
Filed April 2, 1953
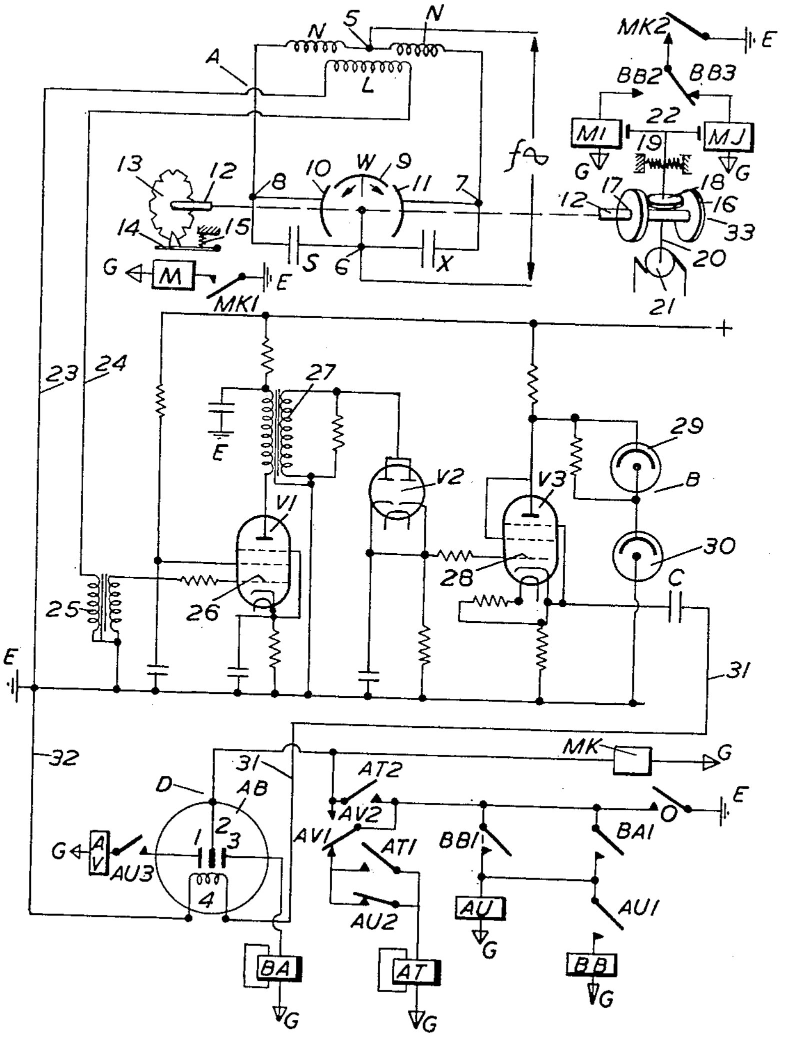
Stanley George Meadows
Robert Norman Sayley
Inventors
By
Richard Lovell Cleaver
Attorney